United States Patent
Koerner et al.

(10) Patent No.: US 7,606,828 B2
(45) Date of Patent: Oct. 20, 2009

(54) DELTA-MECHANISM FOR INTEGRATION OF OLAP-BASED PLANNING AND REPORTING

(75) Inventors: Hartmut Koerner, Rauenberg (DE); Erich Marschall, Nussloch (DE)

(73) Assignee: SAP AG, Walldorf (DE)

( * ) Notice: Subject to any disclaimer, the term of this patent is extended or adjusted under 35 U.S.C. 154(b) by 332 days.

(21) Appl. No.: 10/717,186

(22) Filed: Nov. 18, 2003

(65) Prior Publication Data

US 2005/0108294 A1 May 19, 2005

(51) Int. Cl.
G06F 7/00 (2006.01)
G06F 17/00 (2006.01)

(52) U.S. Cl. ............... 707/103 R; 707/3; 707/103 Y; 707/103 X; 707/103 Z

(58) Field of Classification Search .............. None
See application file for complete search history.

(56) References Cited

U.S. PATENT DOCUMENTS

| | | | | |
|---|---|---|---|---|
| 5,745,904 A | * | 4/1998 | King et al. | 707/200 |
| 5,903,898 A | * | 5/1999 | Cohen et al. | 707/204 |
| 6,094,651 A | * | 7/2000 | Agrawal et al. | 707/5 |
| 6,158,019 A | | 12/2000 | Squibb | |
| 6,256,712 B1 | * | 7/2001 | Challenger et al. | 711/141 |
| 6,446,059 B1 | * | 9/2002 | Berger et al. | 707/2 |
| 6,516,327 B1 | * | 2/2003 | Zondervan et al. | 707/200 |
| 6,516,339 B1 | * | 2/2003 | Potts et al. | 709/203 |
| 6,768,995 B2 | * | 7/2004 | Thier et al. | 707/100 |
| 6,831,668 B2 | * | 12/2004 | Cras et al. | 715/853 |
| 6,851,107 B1 | * | 2/2005 | Coad et al. | 717/108 |
| 6,947,956 B2 | * | 9/2005 | Olstad et al. | 707/200 |
| 7,003,560 B1 | * | 2/2006 | Mullen et al. | 709/223 |
| 7,035,866 B1 | * | 4/2006 | Chen et al. | 707/102 |

(Continued)

FOREIGN PATENT DOCUMENTS

WO  WO 01/98951  12/2001

OTHER PUBLICATIONS

"A one-pass aggregation algorithm with the optimal buffer size in multidimensional OLAP", by Lee et al., Proceedings of the 28th international conference on Very Large Data Bases, Hong Kong, China, pp. 790-801, Year of Publication: 2002.*

(Continued)

*Primary Examiner*—Tim T. Vo
*Assistant Examiner*—Jay A Morrison
(74) *Attorney, Agent, or Firm*—Mintz, Levin, Cohn, Ferris, Glovsky and Popeo, P.C.

(57) ABSTRACT

A database system may include a database, a set of tools for accessing the database, a data buffer for storing data objects from the database, and a "delta buffer" for storing delta records. Simulations may be performed in the database system by the set of tools that access the database. Simulative changes of the data may be handled by the delta buffer. The delta buffer need not contain all the data used for simulations and may include delta records. Each delta record may include simulative changes of the data and a request identifier. The content of the delta buffer may be integrated with the unchanged, original data from the database. The delta buffer in combination with the data buffer may provide an integrated view for tools that access the database, such as planning and reporting tools.

17 Claims, 5 Drawing Sheets

U.S. PATENT DOCUMENTS

| | | | |
|---|---|---|---|
| 7,171,427 B2 * | 1/2007 | Witkowski et al. | 707/104.1 |
| 7,181,450 B2 * | 2/2007 | Malloy et al. | 707/4 |
| 2002/0016771 A1 * | 2/2002 | Carothers et al. | 705/43 |
| 2002/0049622 A1 * | 4/2002 | Lettich et al. | 705/7 |
| 2002/0073005 A1 * | 6/2002 | Welnicki et al. | 705/35 |
| 2002/0082950 A1 * | 6/2002 | Anderson et al. | 705/27 |
| 2002/0138318 A1 * | 9/2002 | Ellis et al. | 705/7 |
| 2002/0178146 A1 * | 11/2002 | Akella et al. | 707/2 |
| 2003/0093424 A1 | 5/2003 | Chun et al. | |
| 2003/0149578 A1 * | 8/2003 | Wong | 705/1 |
| 2003/0229650 A1 * | 12/2003 | Olstad et al. | 707/200 |
| 2004/0187140 A1 * | 9/2004 | Aigner et al. | 719/328 |
| 2004/0225649 A1 * | 11/2004 | Yeo et al. | 707/3 |
| 2004/0225675 A1 * | 11/2004 | Benson | 707/102 |

OTHER PUBLICATIONS

"DB-Prism: Integrated Data Warehouses and Knowledge Networks for Bank Controlling", by Schafer et al., Proceedings of the 26th International Conference on Very Large Databases, Cairo, Egypt, 2000.*

* cited by examiner

DELTA-MECHANISM FOR INTEGRATION OF OLAP-BASED PLANNING AND REPORTING

BACKGROUND

The following description relates to database systems.

Database systems are commonly employed in computing systems to store and organize information. A database system may include a database, a program for accessing the database, and any number of mechanisms to access records in the database. In a business-oriented database system, operations carried out by tools that may access the database may include reporting, manual planning (interactive planning), and planning functions (automated planning). The database may be a multidimensional database. In such a database system, the database may include, for example, a buffer that reads a selection of data from a multidimensional database into memory and allows changes of these data during a planning session, i.e. during manual planning and planning functions operations. The buffer may handle both reading the data, managing changes and storing the changes in the database. Changes to the data may be made by user interaction or automated planning functions.

Planning tools are typically loosely integrated with other online analytical processing ("OLAP") tools, such as reporting. Thus, the buffer of a planning tool, for example, need not be accessible from other software agents. Also, planning tools have a very limited subset of OLAP features. For example, planning data need not be stored in a data warehouse. Planning data may be stored locally to a planning tool. In that case, planning data, including changed data, may be inaccessible to a reporting tool until the data is stored in the database.

OLAP is a well-established technology to analyze data that are stored within a multidimensional database for the purpose of reporting. Planning using multidimensional databases has become more popular. Technically, the execution of business planning tasks on these multidimensional structures entails changing the data in a simulative manner. This can happen via direct user interaction on a planning sheet, where a user enters planning data, or via automatic planning functions where the planning software changes the data (e.g. automated forecast functions). In both cases there is a need that the data changes are not stored or persisted directly in the database but are kept in memory.

SUMMARY

An integrated view on reporting and planning operations includes providing a consistent, integrated view on both persisted data and changed data. Persisted data should be read with high performance and should be integrated with the changed data. At the end of a planning session, the changed data may be stored with the persisted data.

A database system may include a database, a set of tools for accessing the database, a data buffer for storing data objects from the database, and a "delta buffer" for storing delta records. The data buffer may include sections from the database that are defined by a certain aggregation level and filter criteria. In addition, the data buffer may store sections of a multidimensional database in a system memory of a computer system. Simulations may be performed in the database system by a set of tools that access the database, which may simulate changes to data stored in the data buffer. Simulative changes of the data may be handled by the delta buffer. Rather than store all the data used for simulations, the delta buffer may store delta records. Each delta record may include simulative changes of the data and a request identifier. The delta record may be cumulative, such that multiple changes can be aggregated to create the cumulative delta record. The content of the delta buffer may be consistently integrated with the unchanged original data from the database. The delta buffer in combination with the data buffer may provide an integrated view for tools that access the database, such as planning and reporting tools.

The database system described here may provide one or more of the following advantages. A consistent, integrated view may be provided for tools that access multidimensional data, including business planning tools, such as planning tools and reporting tools; what-if-analyses tools, such as tools that study the effects of future changes on various types of key figures; and/or, statistical forecast tools, such as tools that may model past observations to provide insight on trends. The tools that access multidimensional data may be configured for manual planning, i.e. manual entering of planning data via a user interface, and/or automatic planning, i.e. calculating plan figures by means of special algorithms like top-down distribution or statistical forecasting algorithms. The integrated view may advantageously allow a user to rapidly realize the effects of changes made by tools that change data, such as planning tools, in other tools that may access the database data, such as reporting tools.

A buffer may be provided that integrates changes to database data before changes are persisted to the database. The changes in the buffer may be accessible to tools that may access the database before the changes are persisted to the database. Because the changed data may be available before changes are persisted to the database, performance may be improved because database data need not be stored in a database before the changed data may be used by other tools that may access database data. For example, results from planning tools may be available without the time delay of extraction processes. Changed database data that are buffered may be advantageously accessed by any number of OLAP features, including navigation, calculations of conditions, calculation of figures, and conversions of currencies. Because OLAP features may be used to access changed data, performance may increase based on the premise that OLAP features tend to have many technologies that access multidimensional data with high performance. Also, original data in the database may still be accessible via the OLAP engine; thus, the original data may still be accessible at high performance read accesses. Changed database data that are buffered may be stored in the database, such that changes are persisted to the database. The buffer may advantageously be reusable because many tools may access the buffer and separate engines for each tool need not be generated.

Details of one or more implementations are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

DETAILED DESCRIPTION

The systems and techniques described here relate to a database system including a database, a data buffer, and a delta buffer.

A database system includes a database, a tools for accessing the database, a data buffer for storing data objects from the database, and a delta buffer for storing delta records. The data buffer may include sections that are defined by a certain aggregation level and filter criteria. In addition, the data buffer may store sections of a multidimensional database in a system memory of a computer system. Simulations may be performed in the database system by tools that access the database, which may simulate changes to data stored in the data buffer. Simulative or other changes of the data may be handled by the delta buffer. The delta buffer may store delta records rather than all the data used for simulations. Each delta record may include simulative changes of the data and a request identifier. The delta record may be cumulative, such that multiple changes are aggregated to create the cumulative delta record. The content of the delta buffer may be consistently integrated with the unchanged original data from the database. The delta buffer in combination with the data buffer may provide an integrated view for tools that access the database, such as planning and reporting tools.

Figure 1:
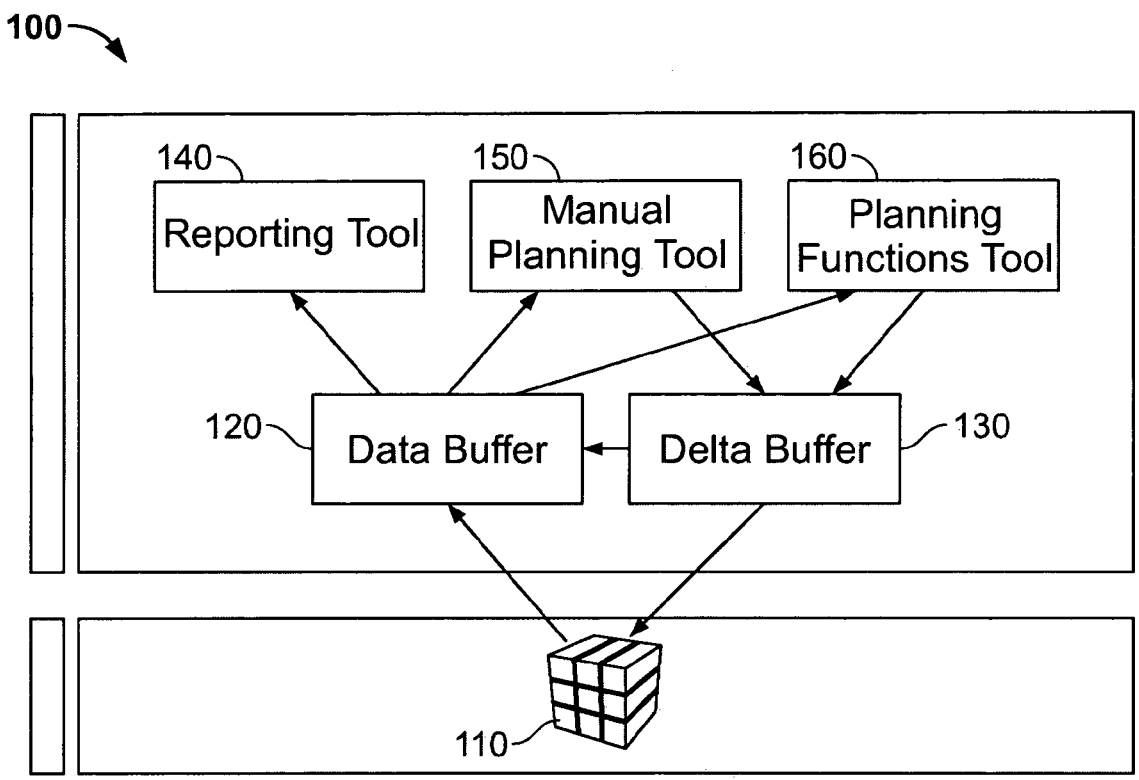
FIG. 1 is block diagram of a database system.

FIG. 1 is block diagram of an example database system 100. The database system 100 includes a database 110, a data buffer 120, a delta buffer 130, a reporting tool 140, a manual planning tool 150, and a planning functions tool 160. The database 110 may be a multidimensional database usable for OLAP operations. For example, the database 110 may be configured as a multidimensional data cube in which each data attribute, such as product type, geographic sales region, and/or time period, is represented as a separate "dimension" of the data cube. The multiple dimensions may be used to view and/or access the data in a multidimensional database.

The database system 100 includes a buffer for buffering data objects in memory, such as the data buffer 120. The data buffer 120 may store data objects and a description of the data objects. For example, a data buffer 120 for a multidimensional database may buffer data objects with a logical key, a description of the aggregation level, and a description of a selection condition. The logical key may correspond to the database of the data object, such as the database 110. The database 110 may be a data cube such that a logical key would correspond to the data cube. The aggregation level may be described by a list of characteristics and key figures, from which aggregates may be constructed of the data object. The selection condition may describe a slice of the multidimensional database corresponding to the data object.

The data buffer 120 can be populated with data objects accessed or read from the database 110 in response to requests for data objects from tools that use the database 110. For example, a reporting tool 140 may request data from the database 110. The tool may check the data buffer 120 to determine if the data buffer 120 has a data object corresponding to the data requested. If the data is not stored in whole or in part in the data buffer 120, data may be read from the database 110. The data read from the database 110 can be stored in the data buffer 120. In order to fulfill the request, OLAP operations, such as aggregating or slicing a data object may be used to manipulate one or more data objects, including recently stored data objects.

Requests can be fulfilled without reading data from the database 110. For example, database 110 need not be read if a tool requests data that is already in the data buffer 120. Data may still be considered in the data buffer 120 if one or more data objects need to be manipulated in order to fulfill the request. For example, in a multidimensional database system, OLAP operations, such as aggregating or slicing a data object, may be used to manipulate one or more data objects in the data buffer 120 to fulfill the request.

The database system 100 also includes a buffer, such as delta buffer 130, that includes changes made to data objects by tools that access the database 110. Tools, such as the manual planning tool 150 and planning functions tool 160, may change data associated with data objects in the data buffer 120. The changes may be manual or automated. For example, manual changes may include changes made in response to user input of data via the manual planning tool 150. Automated changes, for example, may include changes made in response to services executed by the planning functions tool 160. Services may include, for example, automated tasks that process data.

The delta buffer 130 is configured to store delta records. A delta record represents changes made to data. A delta record may be cumulative, such that multiple changes are aggregated to create a cumulative delta record. A tool that accesses data objects from the data buffer 120 may generate delta records. For example, the manual planning tool 150 may access the data buffer 120 to retrieve data, such as a value 110 representing a price for trucks, and make a first change to the data, such that the value is changed to 100. The manual planning tool 150 may calculate the changes made to the data, generate a first delta record, and store the first delta record in the delta buffer 130. The first delta record may represent that 10 less should be stored in the data corresponding to the price for trucks; i.e. the difference between 110 and 100. The manual planning tool 150 may make a second set of changes to the data, such that the value changes to 150. The manual planning tool 150 may calculate the changes made to the data to determine a representation of the second set of changes, generate a second delta record, and store the second delta record in the delta buffer 130. The second delta record may represent that 50 more should be stored in the data corresponding to the price for trucks; i.e. the difference of 100 and 150. Alternative implementations may represent the cumulative difference between the original, unchanged data and the most recent data. For example, in alternative implementations, the manual planning tool 150 may alter the first delta record to represent the cumulative changes between the initial value and the most recent value, such that a single delta record represents that 40 more should be the value; i.e. the difference between the initial value 110 and most recent value 150. In other implementations, both a first and second delta record may be generated and buffered, and the delta buffer 130 may be compressed such that the first and second delta records may become a single delta record. Following the earlier example, the first delta record may represent a first change to the price for trucks, such as 10 less, and the second delta record may represent a second change to the price for trucks, such as 50 more. The delta buffer 130 may be compressed such that a single delta record is generated that represents a cumulative change to the price for trucks, such as 40 more.

A delta record may include the changes made to the data object rather than the entire data object with changes. Following the previous example, rather than including all truck sales information for all years, makes, and models, the first delta record may merely include the first change related to the sales price for a particular year, make, and model. In addition, the delta record may include a request identifier. The request identifier can be appended to the delta record by a tool that generates the delta record, or by any number of processes or mechanisms. For example, the tool that generates delta records, such as the planning functions tool 160, may generate the request identifier and append it to the delta record before transferring the delta record to the delta buffer 130. The request identifier may serve to identify the delta records that have been used to update a data object. For example, the request identifier, with a value such as 0024, may be appended to a delta record. If the data objects corresponding to the delta record are updated with the delta record, the request identifier may be stored in those data objects. By having the request identifier in the data objects, the data objects have an indication of the delta records that have updated the data objects. In alternative implementations a request identifier need not be included. For example, if the data objects are immediately updated with all changes represented by delta records, a request identifier will not be necessary to identify the delta records that have been used to update a data object because all delta records should have updated all data objects.

The content of the delta buffer 130 may be integrated with the unchanged, original data from the database 110. For example, a program, such as a server program, may be separate from the tools that access the database 110, and may handle all accesses to the database 110 and the delta buffer 130. In response to detecting a delta record in the delta buffer 130, the server program may determine the corresponding data object in the data buffer 120 and update the data object with the changes represented by the delta record. In a multidimensional database, determining the corresponding data object may involve determining if the delta record is within the selection condition of the data object. For example, in a database of truck sales, the selection condition for a data object in the data buffer 120 may be "trucks priced above 500 dollars in the year 2003," and a delta record may represent a change, for example changing the model of a truck from "small size" to "pickup", for a truck that is priced at 750 dollars in the year 2003. In that case, the delta record would be determined to be within the selection condition and the data object may be updated. Integration of the delta buffer 130 may occur on a routine basis and 130 may be compressed periodically. Compressing the delta buffer 130 may include, in a multidimensional database system, for example, rolling up delta records such that delta records are aggregated along a dimension. Compressing the delta buffer 130 may also include updating all data objects in the data buffer 120 with delta records. Also, compressing the delta buffer 130 may include generating a request identifier corresponding the most recent delta record. For example, in the previous example, the delta records were compressed when the first delta record and the second delta record were combined into a single delta record representing the cumulative difference. To ensure the data objects are properly updated, all the data objects may be updated with the delta records. Following an earlier example, if a data object is updated with the first delta record but not the second delta record, such that the value is 100, a cumulative delta, such as 40 more, may confuse the changes that should be made to the data object, such as 50 more, because there may no longer be an indication of the different series of changes made to the data corresponding to the cumulative delta record. Thus, updating ensures that the value of the data in the data object is 150 to reflect the series of two changes. Also, the cumulative delta record may have the request identifier of the most recent delta record that was used to generate the cumulative delta record. This request identifier may represent the delta records that make up the cumulative delta record. For example, if request identifiers are sequential numbers, such that the more recent request identifiers are larger numbers, the request identifier of 1652 for a complete delta may represent that all delta records with a request identifier less than 1652, such as 1651, were used to generate the complete delta record. This may also be advantageous in differentiating a cumulative delta record from other delta records that are recently generated and identifying the delta records, including cumulative delta records, used to update data objects. Following the prior example, the cumulative delta record with a request identifier of 1652 would be less recent than a delta record with a request identifier 1653. If a data object is updated with the cumulative delta record with an associated request identifier 1652, the database system can determine that the data object has yet to be updated with the delta record with request identifier 1653. Alternative implementations may exist. For example, data objects may be immediately updated with the changes reflected by delta records. In that case, updating need not be included in the process of compression the delta buffer 130 because the updating of data objects will not necessarily be confused by a cumulative delta record that compresses multiple changes.

The tools for accessing the database may be read-only, such that data can be manipulated for viewing, but not changed. For example, the reporting tool 140 may be read-only, and can be used to view data from the database 110, such as data corresponding to the price, sales, make, model, and year of trucks sold by a company. The reporting tool 140 may manipulate the data to change how the data may be viewed, such as configuring the data so that merely information related to the make is displayed; however, the reporting tool 140 will not necessarily change the values corresponding to the data, such that the values corresponding to the price, sales, make, model, and year of trucks sold by the company will still be the same.

The tools that access data from the database 110 may also include tools that change data corresponding to data in the database 110, such as the manual planning tool 150 and the planning functions tool 160. Changing data may include modifying the data, adding data, and removing data. Tools may change data using any number of mechanisms and/or processes. For example, the manual planning tool 150 may change data based on user input. If the database system 100 includes data relating to the price, sales, make, model, and year of trucks sold by the company, a user may use a tool such as the manual planning tool 150 to determine the expected sales of a certain make, model, and year of a truck based on changes to the price. The user may input a different value for the price via the manual planning tool 150 and may cause 150 to determine the expected sales.

An integrated view of multiple tools may be provided such that changes to data in the data buffer are rapidly realized in other tools. For example, the reporting tool 140 and the manual planning tool 150 may be integrated into a single web-based application which displays the reporting tool 140 in the bottom portion of a screen and the manual planning tool 150 in the top portion of the screen. The web-based application may access a multidimensional database that has data corresponding to time period, sales price, make, model, year, and sales of trucks. The manual planning tool 150 may display the figures in user-editable fields. The reporting tool 140 may display reports corresponding to the data in the database. The manual planning tool 150 can be used to edit the sales price for a given time period in an effort to determine sales of trucks. If a user edits the sales prices, the manual planning tool 150 may generate a delta record and store the delta record in the delta buffer 130. The data buffer 120 may be updated with the delta record. In response to the updating of data in the data buffer, the reporting tool 140 may access the data buffer 120 and display a report including the changed data. Thus, an integrated view of the reporting tool 140 and the planning tool 150 may be provided such that changes to the data in the data buffer by one tool, such as the planning tool 150, may be rapidly realized in other tools, such as the reporting tool 140.

FIGS. 2A, 2B, 2C, 2D, and 2E are block diagrams that illustrate database system operations in a database system 200. The database system 200 includes a database 205, a data buffer 210, and a delta buffer 215. In addition, the database system may include a server program that handles the delta buffer 215 and data buffer 210. The database 205 may be a multidimensional database usable for OLAP operations. The data buffer 210 is configured for buffering data objects accessed from the database 205. The data buffer 210 may store data objects. Data objects may include data and a description of the data. The description may include, for example, in a data buffer 210 for a multidimensional database, a logical key, a description of the aggregation level, and a description of the selection condition. Alternatively, the description of the data in a data object need not be included in the data object, and may be included in the data buffer 210, separate from the data object.

Figure 2A:
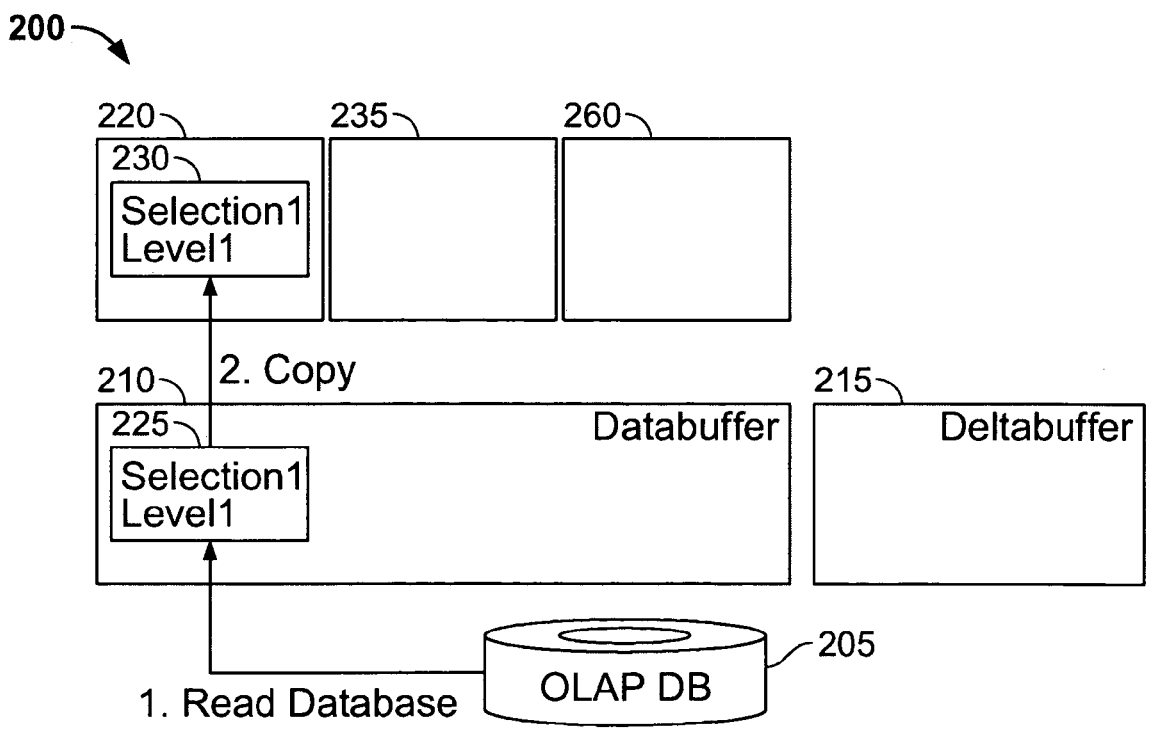
FIGS. 2A, 2B, 2C, 2D, and 2E are block diagrams that illustrate database system operations.

FIG. 2A illustrates a read request from a tool that accesses the database, such as the reporting tool 220. The reporting tool 220 may request data with a certain aggregation level and a certain selection condition. The server program may determine if the data buffer 210 has data corresponding to the requested data. If the data buffer 210 has no data corresponding to the requested data, or only part of the data corresponding to the requested data, data is read from the database 205. For example, the reporting tool 220 may request data with an aggregation level 1 and a selection condition 1. The server program may determine that the data corresponding to the requested data is not available in the data buffer 210 and request that data is read from the database 205. In response to the read request, the database 205 is read and the data buffer 210 stores a data object 225 with an aggregation level 1 and selection condition 1. The reporting tool 220 may then cause a copy of data object 225, such as data object 230, to be generated and sent to reporting tool 220. Alternatively, if the data buffer 210 has the data corresponding to the data requested, such that one or more data objects in the data buffer 210 may be manipulated to fulfill the request, the server program will not necessarily cause data to be read from the database 205. For example, if the reporting tool 220 requested data corresponding to the data with an aggregation level 1 and selection condition 1, the data may be available in the data buffer 210. In that case, the database 205 will not necessarily be read, and the reporting tool 220 may cause a copy of data with an aggregation level 1 and selection condition 1 to be generated from the data buffer 210 and transferred to the reporting tool 220.

Figure 2B:
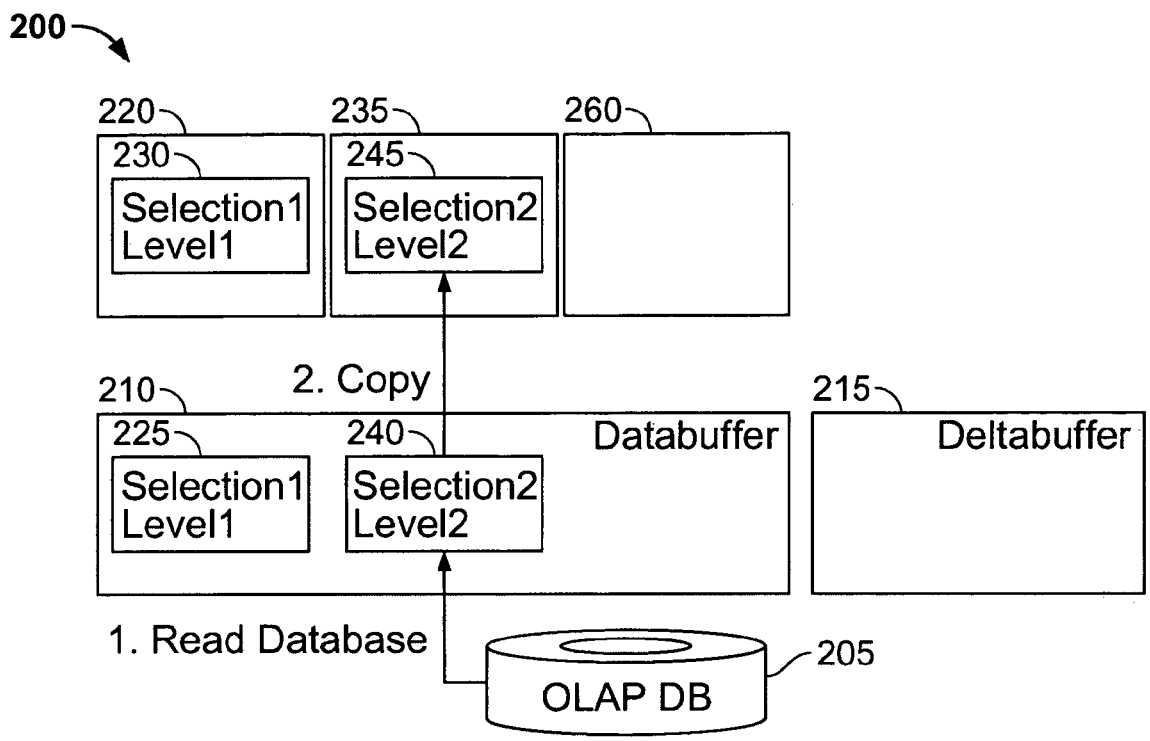

FIG. 2B illustrates a read request from a tool that accesses the database, such as manual planning tool 235. In FIG. 2B, manual planning tool 235 requests data with a certain aggregation level and a certain selection condition. In response to the request, the server program may determine if the data buffer 210 has data corresponding to the requested data. If the data buffer 210 has no data corresponding to the requested data, or only part of the data corresponding to the requested data, the server program may cause data to be read from the database. For example, the manual planning tool 235 may request data with an aggregation level 2 and a selection condition 2 and the server program may determine that the data corresponding to the requested data is not available in the data buffer 210, i.e. data object 225 does not have all the data required to fulfill the request by manual planning tool 235. The server program may request a read of the database 205. In response to the read request, the data buffer 210 may store a data object 240 with an aggregation level 2 and selection condition 2. The manual planning tool 235 may then generate a copy of data object 240, such as data object 245, and make the copy available to the manual planning tool 235. Alternatively, if the data buffer 210 has the data corresponding to the requested data, such that one or more data objects in the data buffer 210 may be manipulated to fulfill the request, the server program will not necessarily cause data to be read from the database. In alternative implementations, any combination of any mechanisms or processes, including the server program or the tool, may perform any of the operations related to the handling of the data buffer and/or delta buffer, including reading from the database 205, generating copies of data objects in the data buffer 210, and storing data objects in the data buffer 210.

Figure 2D:
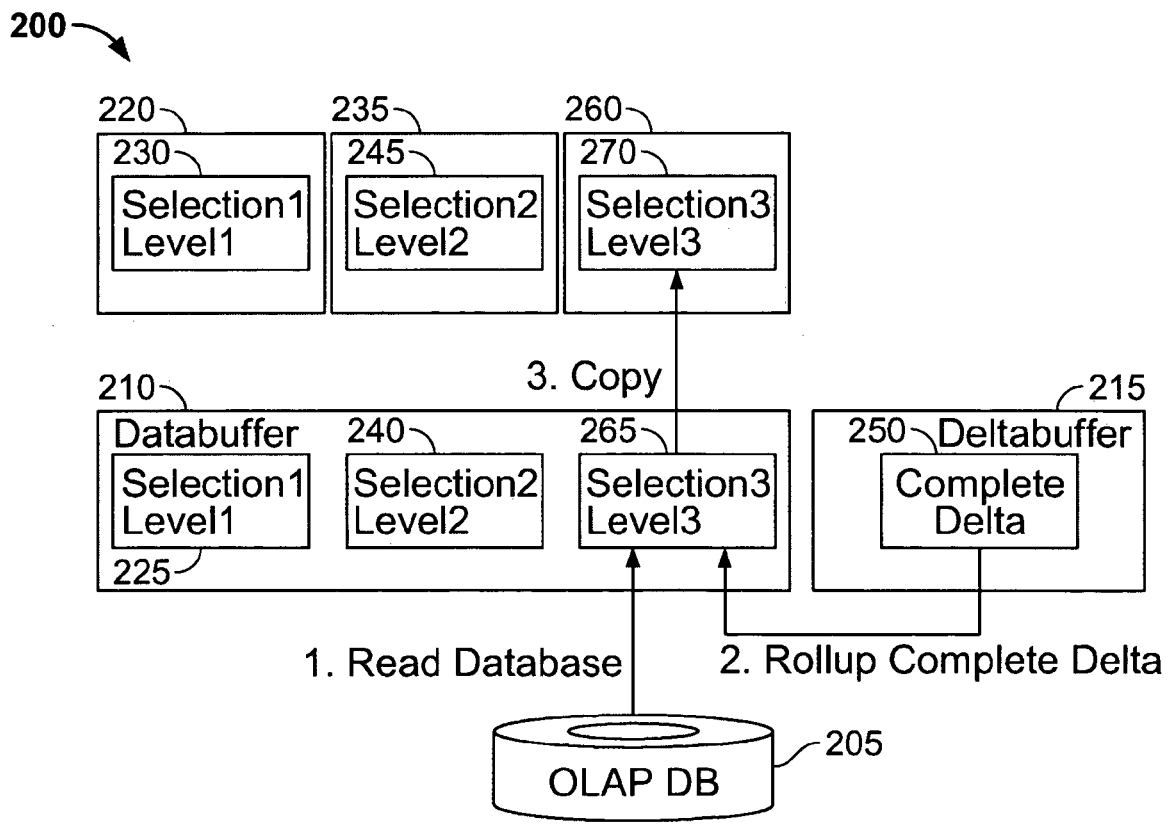
Figure 2C:
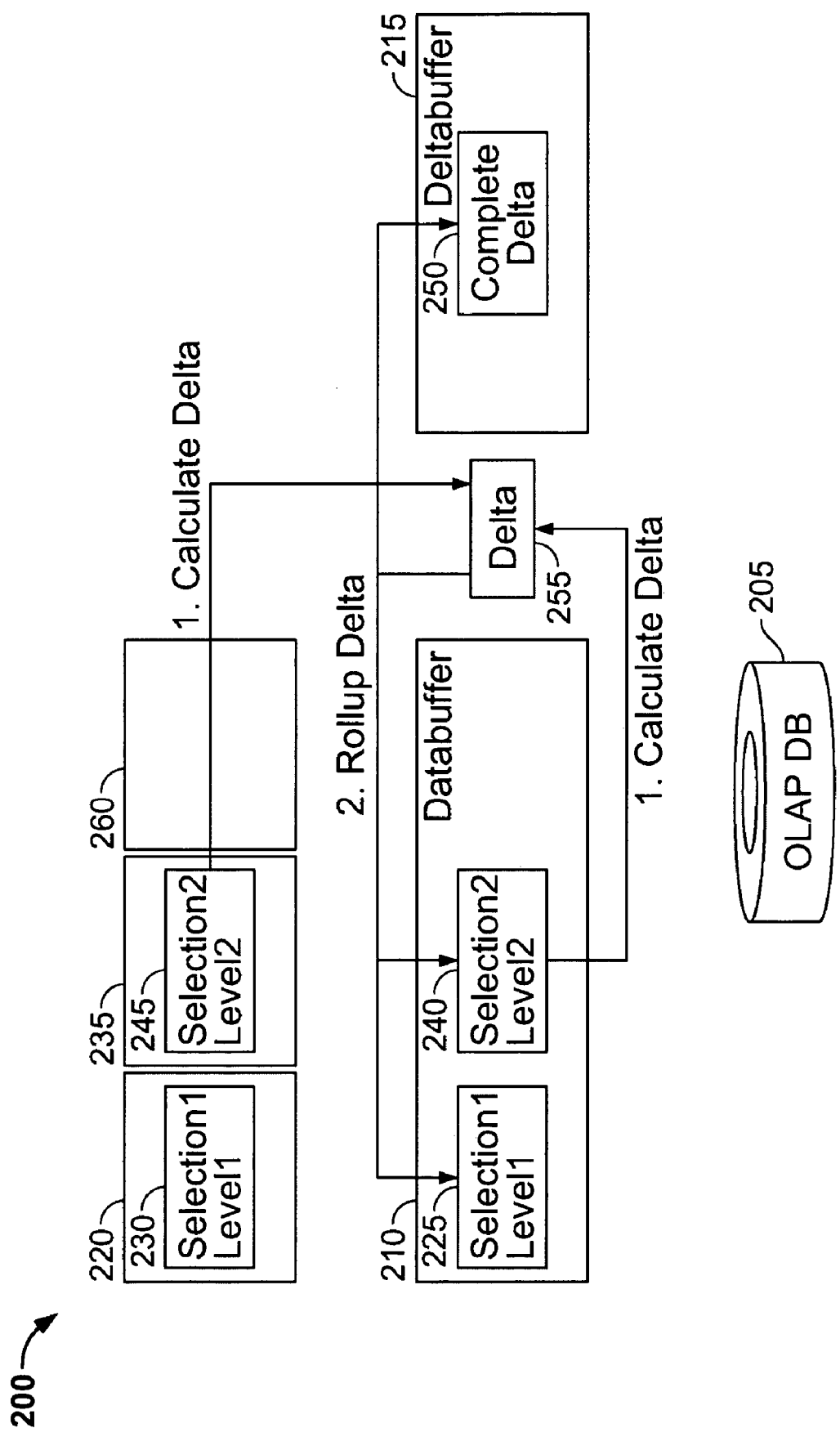

FIG. 2C illustrates the generation of a delta record. A tool that accesses the database, such as manual planning tool 235, may make changes to data corresponding to data in the database. In response to those changes, a delta record is generated to represent the changes to data. The delta record may be generated by calculating a delta, which may include the difference between the unchanged data in the data buffer 210 and the changed data. The delta may be included in a delta record and stored in the delta buffer 215. The buffered delta record may also include a request identifier. The delta or the delta record may be used to integrate the changes to the data buffer 210, i.e. update the data buffer 210. The operations of generating the delta and/or delta record may be performed by any of a number of mechanisms, including the server program and/or a tool in the database system. For example, the manual planning tool 235 may make changes to the data corresponding to the data object with an aggregation level 2 and selection condition 2. The manual planning tool 235 may calculate the difference between the changed data and the data in the data buffer 210, and generate a delta 255 representing the changes. The manual planning tool 235 may use the delta 255 to generate a delta record (not shown) representing the changes. A request identifier may be appended to the delta record, and the delta record may be stored in the delta buffer 215. The delta and/or delta record may also be used to update data objects (225, 240) in the data buffer 210. Data objects need only be updated if they correspond to the delta. In addition, the delta buffer 215 may be compressed. For example, in a multidimensional database system, compression may include updating the data buffer 210 with all delta records. Compression may further include rolling up the delta records to create a cumulative delta, such as complete delta record 250.

FIG. 2D illustrates a request for data from a tool that accesses the database, such as planning functions tool 260. According to FIG. 2B, a tool that accesses the database, such as planning functions tool 260, requests data corresponding to a certain aggregation level and certain selection condition. The server program may determine if the data buffer 210 has data corresponding to the requested data. If the data buffer 210 has no data corresponding to the requested data, or only part of the data corresponding to the requested data, the server program causes data to be read from the database. For example, the planning functions tool 260 may request data with an aggregation level 3 and a selection condition 3. The server program may determine that the data corresponding to the requested data is not available in the buffer 210, i.e. data objects 225 and 240 do not have the data required to fulfill the request by planning functions tool 260. In response to that determination, the server program causes a read of the database 205. And, in response to the read request, a data object 265 with an aggregation level 3 and selection condition 3 would be stored in the data buffer 210. If the delta buffer 215 includes changes corresponding to the data object 265, data object 265 would be updated with the changes. The planning functions tool 260 may then generate a copy of data object 265, such as data object 270, and make the copy available to planning functions tool 260. Alternatively, if the data buffer 210 has the data corresponding to the requested data, such that one or more data objects in the data buffer 210 may be manipulated to fulfill the request, the data buffer 210 need not cause data to be read from the database 205.

Figure 2E:
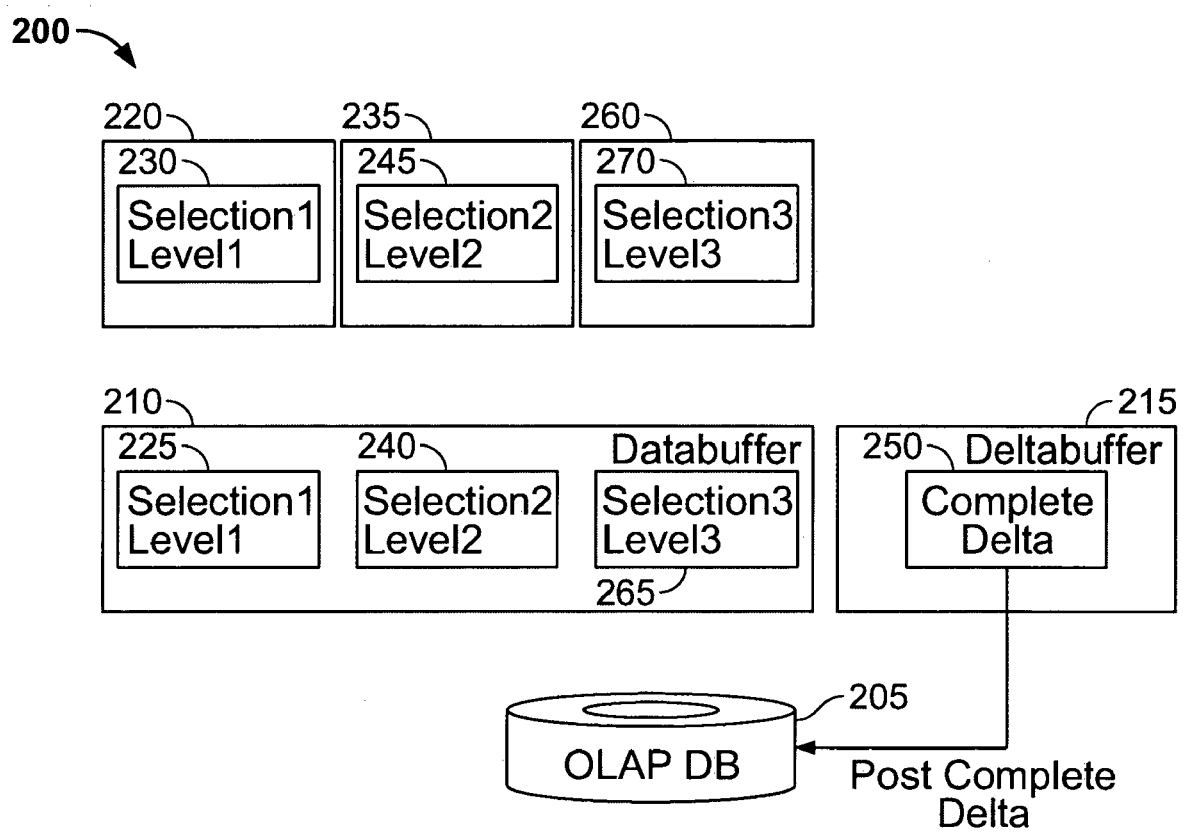

FIG. 2E illustrates storing changes corresponding to delta records to the database 205. Changes corresponding to delta records may be stored in response to various events, including user requests; or, according to a routine, including automated routines. For example, a user may be simulating changes to data, using manual planning tool 235, and the user may desire to save the changes. In a mouse-driven user interface environment, a user may cause the files to be saved by clicking on a button, such as a button named "save changes to database," which causes the changes corresponding to the delta buffer 215 to be saved. Alternatively, changes may be saved for any number of reasons by any number of mechanisms and/or processes. For example, the planning functions tool 260 may have an automated service that models data. The automated service may cause all the changes that result from modeling the data to be stored in the database 110. In an other example, changes reflected in the delta buffer 215 may be stored automatically in the database 110 in the background, such that storing changes to the database 110 does not interface with database accesses. The storing of data may, for example, occur between database accesses. In alternative implementations, changes may be stored in the database 110 from sources other than the delta buffer 215. For example, the changed data in the data buffer 210 may be stored in the database 110.

Storing the changes corresponding to delta records can include a process that ensures regularity across data corresponding to the delta records and empties the delta buffer 215. For example, storing the delta records in the database may include compressing the delta buffer 215, which may update all the data objects in the data buffer 210 and roll-up all delta records; storing the compressed delta records in the database 110; and, flushing the delta buffer 215, which may delete all the delta records in the delta buffer 215 in order to empty the delta buffer 215.

Figure 3:
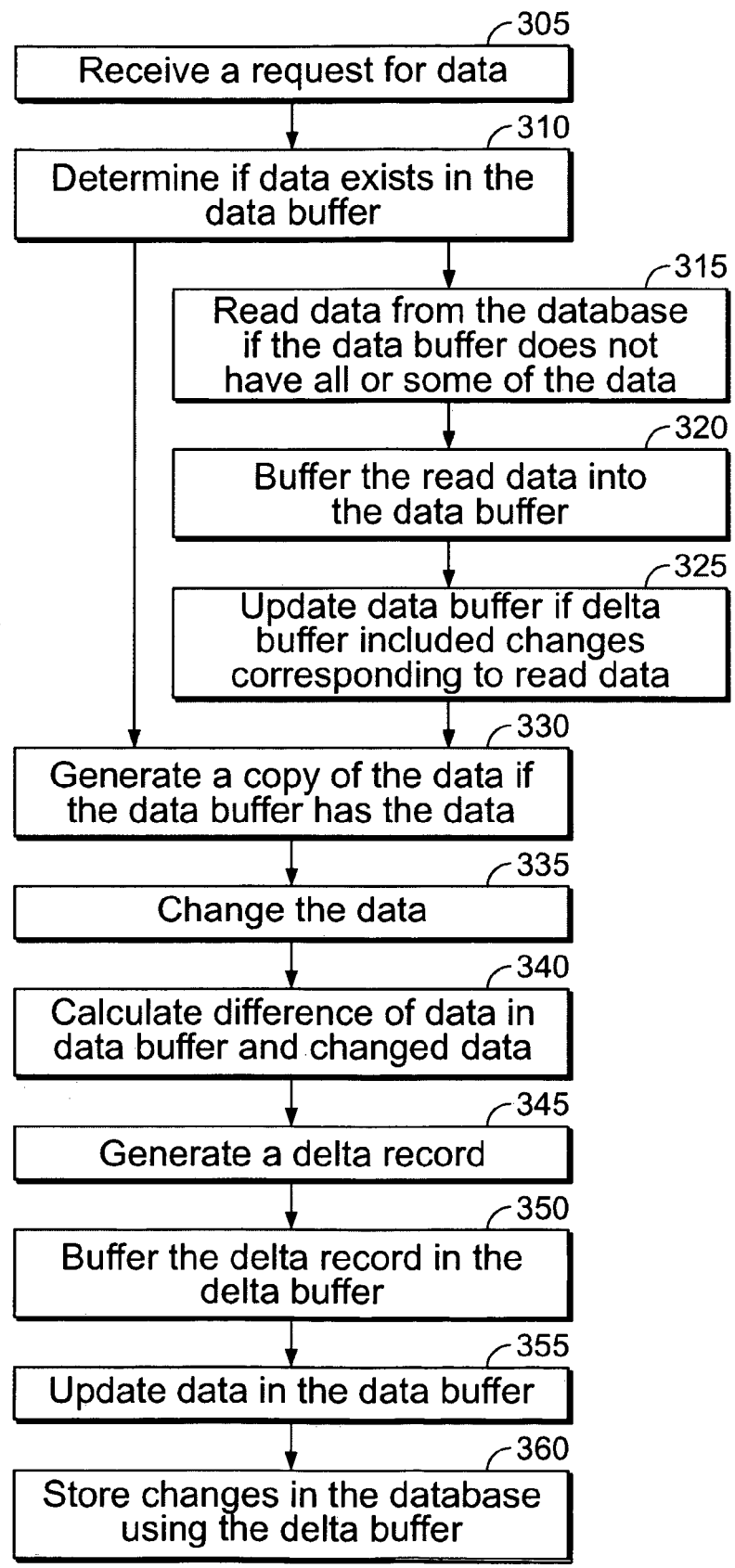
FIG. 3 is a flowchart that illustrates a method for using a database system.

FIG. 3 is a flowchart that illustrates a method for using a database system that may include a delta buffer. A database system receives a request for data at 305. The database system may, for example, include a multidimensional database and a set of tools for viewing and changing data corresponding to the database. The request may originate from a tool that views the database and does not change data, such as a reporting tool. Alternatively the request may originate from a tool that changes data, such as a planning tool. In a multidimensional database system the data request can be described by specifying a certain aggregation level and/or selection condition.

A determination may be made to see if a data buffer has data to fulfill a request for data at 310. The determination may be made by any mechanisms and/or processes including, for example, a server program. A server program may, for example, be included in the database system and the server program may handle requests for data and the handling of the data buffer. The server program, in response to a request for data, may determine if data exists such that a request can be fulfilled.

Data is read from the database if a data buffer does not have all or some requested data at 315. For example, a tool that accesses the database, such as a planning tool, may request data with an aggregation level 1 and a selection condition 1. The tool may determine that the data buffer does not have data to fulfill the request. In response to this determination the tool causes the data to be read from the database and the tool reads the data. Alternatively, other mechanisms and/or processes may cause data to be read from the database. For example, the database system may include a server program that may receive a request for data from a tool that accesses the database, such as a planning tool. The server program may determine that the data buffer does not have all or part of the requested data. In response to this determination, the server program causes the data to be read from the database.

Read data is stored in the data buffer at 320. The buffering of data may be handled by, for example, a server program or a tool that accesses the database. Buffered data is represented by data objects. The data buffer includes, in addition to the data objects, a description of the data object corresponding to the read data. For example, a data buffer for a multidimensional database may store data objects with a description that includes a logical key, a description of the aggregation level, and a selection condition. The logical key may correspond to the database of the data object. The database may be a data cube such that each logical key has a corresponding data cube. The list of characteristics and key figures, from which aggregates may be constructed of the data object, may describe the aggregation level. The selection condition may describe a slice of the multidimensional database corresponding to the data object.

A data buffer is updated with changes if the delta buffer includes a delta record corresponding to data in the buffer, at 325. Data objects in the data buffer may have corresponding data in the delta buffer that represents changes that should be made to the data objects in the data buffer. For example, in a multidimensional database, changes may have been made to data corresponding to an aggregation level 2 and selection condition 2. Also, a delta record may be stored in the delta buffer may reflect the changes. A tool that accesses the database may cause the data with an aggregation level 2 and selection condition 2 to be read from the database and stored in the data buffer. In that case, the tool would determine that a delta record corresponds to the buffered data object. In response to this determination, the tool would update the data object in the data buffer. Alternatively, other mechanisms and/or processes may cause an update of the data buffer. For example, a server program may be included in the database system. The server program may handle the delta records and routinely update data objects in the data buffer with delta records.

A copy of data in the buffer is generated if the data buffer has data corresponding to a request for data at 330. Any mechanisms and/or processes, including a tool that accesses the database, may generate the copy. In a multidimensional database system, OLAP tools may be used to fulfill a data request. The requested data may be made available to tools that access the database. For example, a manual planning tool may generate a copy of a data object in the data buffer. The tool may then be able to manipulate the data, including configuring the data for viewing by a user interface, or modifying the data.

Data corresponding to data in the database is changed at 335. Data may be changed by a tool that accesses the database, such as a manual planning tool. Changing data may include modifying data, adding data, and removing data.

Tools may change data using any number of mechanisms and/or processes, including automated tasks.

The difference between data in the data buffer and changed data is calculated at 340. The calculation may be performed by any mechanisms and/or processes, including a server program or a tool that accesses the database. For example, a tool, such as a manual planning tool, may modify a data value, such as a data value corresponding to the number of trucks sold in July 2003. The value may be changed from 10 to 5. In response to the changes, the planning tool may calculate the difference of those values and indicate that the number of trucks sold in July 2003 is 5 less than previously indicated. Alternatively, any technique, mechanism, or format may be used to indicate the difference.

A delta record is generated at 345 based on the changed at 340. For example, a tool that accesses the database, such as manual planning tool, may make changes to data corresponding to data in the database. In response to those changes, a delta record that represents those changes is generated. The changes may be represented by the calculated difference between unchanged data in the data buffer and the changed data generated by a tool. The delta record may include a request identifier and the delta record can be used to integrate the changes to the data buffer. The operations of generating the delta package may be performed by any of a number of mechanisms, including a server program and/or a tool in the database system. The delta record may be compressed such that a complete delta record is generated.

The delta record from 345 is stored in the delta buffer at 350. Any of a number of mechanisms and/or processes may be used to buffer the delta record in the delta buffer, including a tool that accesses the database. Buffering the delta record may include appending a request identifier to the delta record. The request identifier may be appended to the delta record by any mechanism, including, for example, a tool that accesses the database or a server program. A server program may handle requests to buffer delta records and append a request identifier to a delta record. The request identifier may serve to identify the delta records that have been used to update a data object. Alternatively, any combination of mechanisms may buffer the delta record and/or append the request identifier. Also, the request identifier need not necessarily be included if data objects are immediately updated to reflect all changes.

Data in the data buffer is updated to reflect the changes represented by a delta record at 355. Data objects in the data buffer may have corresponding data in the delta buffer that represents changes that should be made to the data objects in the data buffer. In a multidimensional database system, delta records may have corresponding data objects in the data buffer if the delta record is included in the selection condition of the data object. For example, in a database of truck sales information, a delta record may represent that truck sales for the year 2004 should be added to the database, and have figures corresponding to the year 2004. A data object in the data buffer may include a selection condition for "truck sales between the years 2003 and 2005". Because the year 2004 is within the years of 2003 and 2005, the data object would correspond to the delta record and the delta record may be used to update that data object. Any of a number of mechanisms and/or processes may update the data buffer to reflect the changes represented by the delta record, including a tool that accesses the database or a server program.

Changes represented by delta records in the data buffer are stored in the database at 360. Changes corresponding to delta records may be stored in response to any event, including a user request or an automated task that requests changes be stored in the database. In alternative implementations, changes may be stored in the database from sources other than the delta buffer. For example, the changed data in the data buffer may be stored in the database.

Although the methods of using the database system is shown in FIG. 3 as being composed of twelve different processes, additional and/or different processes can be used instead. Similarly, the processes for using the database system need not be performed in the order depicted. Thus, although a few embodiments have been described in detail above, other modifications are possible. Other embodiments may be within the scope of the following claims.

The invention claimed is:

1. A database system embodied in computer-readable storage media, the database system comprising:
   a database, wherein the database is a multidimensional database;
   a plurality of application tools, each of the tools being configured to access data objects from the database, the tools comprising:
      a business reporting tool which performs online analytical processing business reporting operations based on one or more data objects accessed from a data buffer, the business reporting tool configured to view the one or more data objects and to not make changes to the one or more data objects, and
      a business planning tool, integrated with the reporting tool, which performs online analytical processing business planning operations based on the one or more data objects accessed from the data buffer, the business planning tool configured to view the one or more data objects and to change the one or more data objects;
   the data buffer configured to store a copy of the one or more data objects accessed from the database; and
   a delta buffer configured to store a delta record, wherein the delta record characterizes a difference between the one or more data objects and a modified version of the one or more data objects, the modified version being a result of a change made by the business planning tool to the data objects accessed from the database, the data objects buffered in the data buffer having a logical key corresponding to the database of the data objects, a description of an aggregation level described by characteristics and key figures from which aggregates of the data object may be constructed, and a description of a selection condition representing a slice of the multidimensional database, the business reporting tool and the business planning tool requesting data from the data buffer having a specified aggregation level and a specified selection condition, the delta buffer and the data buffer providing an integrated view to the business reporting tool and the business planning tool.

2. A database system in accordance with claim 1, wherein the delta buffer is configured to generate a cumulative delta record.

3. A database system in accordance with claim 1, wherein the delta buffer includes at least one delta record and each delta record has a corresponding request identifier, and wherein the request identifier is usable by a data object to represent the one or more delta records that have been used to update a data object.

4. A database system in accordance with claim 1, wherein the delta buffer includes at least one delta record and the database system is configured to store the at least one delta record with data in the database.

5. A database system in accordance with claim 1, wherein the data buffer and the delta buffer are parts of a system memory of a computer system.

6. A database system in accordance with claim 1, wherein the delta buffer is configured to compress two or more delta records to generate a cumulative delta record.

7. A computer-implemented method comprising:
reading data from a database, wherein the database is a multidimensional database;
storing a data object in a data buffer, wherein the data object includes the data read from the database;
accessing the data object from the data buffer with one of a plurality of application tools, the tools comprising:
a business reporting tool which performs online analytical processing business reporting operations based on one or more data objects accessed from the data buffer, the business reporting tool configured to view the one or more data objects and to not make changes to the one or more data objects, and
a business planning tool, integrated with the reporting tool, which performs online analytical processing business planning operations based on the one or more data objects accessed from the data buffer, the business planning tool configured to view the one or more data objects and to change the one or more data objects;
storing, in a delta buffer, a delta record characterizing a difference between the data object and a modified version of the data object, the modified version being a result of a change to the data object made by one of the application tools; and
updating the data object in the data buffer with the delta record, the data object buffered in the data buffer having a logical key corresponding to the database of the data objects, a description of an aggregation level described by characteristics and key figures from which aggregates of the data object may be constructed, and a description of a selection condition representing a slice of the multidimensional database, the business reporting tool and the business planning tool requesting data from the data buffer having a specified aggregation level and a specified selection condition, the delta buffer and the data buffer providing an integrated view to the business reporting tool and the business planning tool.

8. A method in accordance with claim 7, further comprising:
compressing the delta buffer, wherein compressing the delta buffer includes generating a cumulative delta record.

9. A method in accordance with claim 7, further comprising:
storing the delta buffer in the database, wherein storing the delta buffer in the database includes integrating the one or more delta records in the delta buffer with the corresponding data in the database.

10. A method in accordance with claim 7, further comprising:
associating the delta record with a request identifier, wherein the request identifier is usable by a data object to represent the one or more delta records that have been used to update a data object.

11. An integrated business planning and reporting platform embodied in computer-readable storage media, the platform comprising:
a database storing data, wherein the database is a multidimensional database;
a data buffer configured to store one or more data objects, wherein the at least one data object includes data read from the database;
a business reporting tool which performs online analytical processing business reporting operations based on one or more data objects accessed from the data buffer, the business reporting tool configured to view the one or more data objects and to not make changes to the one or more data objects;
a business planning tool, integrated with the reporting tool, which performs online analytical processing business planning operations based on the one or more data objects accessed from the data buffer, the business planning tool configured to view the one or more data objects and to change the one or more data objects; and
a delta buffer configured to store a delta record characterizing a difference between the one or more data objects and a modified version of the one or more data objects, the modified version being a result of a change made to the one or more data objects by the business reporting tool, the business planning tool, or both, the data objects buffered in the data buffer having a logical key corresponding to the database of the data objects, a description of an aggregation level described by characteristics and key figures from which aggregates of the data object may be constructed, and a description of a selection condition representing a slice of the multidimensional database, the business reporting tool and the business planning tool requesting data from the data buffer having a specified aggregation level and a specified selection condition, the delta buffer and the data buffer providing an integrated view to the business reporting tool and the business planning tool.

12. A platform in accordance with claim 11, further comprising:
a server program configured to manage the data buffer.

13. A platform in accordance with claim 11, further comprising:
a server program configured to manage the delta buffer.

14. A platform in accordance with claim 11, wherein the reporting tool and/or planning tool generates the delta record.

15. A platform in accordance with claim 11, wherein the delta buffer stores at least one delta record and each delta record corresponds to a request identifier, wherein the request identifier represents at least one delta record that has been used to update a data object.

16. A platform in accordance with claim 11, wherein the delta buffer is configured to compress two or more delta records to generate a cumulative delta record.

17. A platform in accordance with claim 11, wherein the delta buffer includes at least one delta record and the database system is configured to store the at least one delta record in the database, wherein storing the at least one delta record includes integrating the at least one delta record with data in the database.

* * * * *

UNITED STATES PATENT AND TRADEMARK OFFICE
CERTIFICATE OF CORRECTION

PATENT NO. : 7,606,828 B2  Page 1 of 1
APPLICATION NO. : 10/717186
DATED : October 20, 2009
INVENTOR(S) : Koerner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 433 days.

Signed and Sealed this

Twelfth Day of October, 2010

David J. Kappos
*Director of the United States Patent and Trademark Office*